United States Patent

Walker et al.

[11] Patent Number: 5,633,334
[45] Date of Patent: May 27, 1997

[54] ETHYLENE-VINYL ACETATE EMULSIONS WITH AN IMPROVED BALANCE OF ADHESIVE PROPERTIES

[75] Inventors: James L. Walker, Whitehouse Station; Paul R. Mudge, Belle Mead; Josephine M. Rosenski, N. Plainfield, all of N.J.

[73] Assignee: National Starch and Chemical Investment Holidng Corporation, Wilmington, Del.

[21] Appl. No.: 585,976

[22] Filed: Jan. 16, 1996

Related U.S. Application Data

[63] Continuation of Ser. No. 299,136, Aug. 31, 1994, abandoned.

[51] Int. Cl.$^6$ .......................... C08F 2/00; C08F 218/04; C08F 210/02
[52] U.S. Cl. .......................... 526/202; 526/319; 526/348; 526/261; 526/273; 526/321; 526/336
[58] Field of Search .......................... 526/202, 319, 526/348, 261, 273, 321, 336

[56] References Cited

U.S. PATENT DOCUMENTS

| | | | |
|---|---|---|---|
| 3,661,696 | 5/1972 | Knutson | 161/204 |
| 3,708,388 | 1/1973 | Lindemann et al. | 161/247 |
| 3,734,819 | 5/1973 | Knutson | 161/254 |
| 3,769,151 | 10/1973 | Knutson et al. | 161/204 |
| 3,827,996 | 8/1974 | Beresniewicz | 260/29.6 WB |
| 4,043,961 | 8/1977 | Beresniewicz et al. | 260/29.6 WA |
| 4,133,791 | 1/1979 | Kemenater et al. | 260/29.6 WA |
| 4,521,561 | 6/1985 | Hausman et al. | 524/459 |
| 4,735,986 | 4/1988 | Iacoviello | 524/427 |
| 5,143,966 | 9/1992 | Lee et al. | 524/459 |

FOREIGN PATENT DOCUMENTS 0484822  5/1992  European Pat. Off. .

OTHER PUBLICATIONS

Covol® Polyvinyl Alcohol Technical Bulletin.
*Covol Polyvinyl*, "CPC International—Now a Source for Both Synthetic and Natural Polymers!".

*Primary Examiner*—Joseph L. Schofer
*Assistant Examiner*—Wu C. Cheng
*Attorney, Agent, or Firm*—Ellen T. Dec

[57] ABSTRACT

A process for the preparation of emulsion polymers comprising 70 to 95% by weight of a vinyl ester and 5 to 30% by weight ethylene, the polymerization being carried out in the presence of 2 to 8% by weight of a protective colloid consisting of a blend of 1 to 3 percent by weight of 80% hydrolyzed polyvinyl alcohol, 0 to 2 percent by weight of 88% hydrolyzed polyvinyl alcohol and 1 to 3 percent by weight of 96% hydrolyzed polyvinyl alcohol, the blend having an average level of hydrolysis of 85 to 88%.

14 Claims, No Drawings

ETHYLENE-VINYL ACETATE EMULSIONS WITH AN IMPROVED BALANCE OF ADHESIVE PROPERTIES

This application is a continuation of application Ser. No. 08/299,136 filed Aug. 31, 1994.

BACKGROUND OF THE INVENTION

Aqueous dispersions containing vinyl ester polymers are well known and are especially useful in the adhesive industry. For such uses, it is common to polymerize the monomer in an aqueous medium containing polymerization initiators and water soluble colloids. The most commonly used colloid is polyvinyl alcohol which has been hydrolyzed to a level of about 88%, i.e., which contains about 12% vinyl acetate. The resulting emulsion polymer is then formulated with either partially or fully hydrolyzed polyvinyl alcohol to obtain adhesive compositions having varying properties.

For many years, attempts have been made to prepare emulsion polymers which can be formulated with both partially and fully hydrolyzed polyvinyl alcohol and which also possess desirable adhesive properties with respect to wet tack and set speed and also have good machining properties. In particular, emulsion polymers prepared with the 88% hydrolyzed polyvinyl alcohol cannot be formulated with the fully hydrolyzed polyvinyl alcohol. This limits their use for certain end use applications where this stability is required.

Various approaches have been taken to overcome these problems. Most of these approaches have been based on the theory that raising the overall level of hydrolysis of the polyvinyl alcohol used in the polymerization of the emulsion polymer will promote improved compatibility of the emulsion when it is subsequently formulated with the fully hydrolyzed polyvinyl alcohol. In these cases, it has been proposed to use, as the polymerization colloid, polyvinyl alcohol which has been more highly hydrolyzed so as to so provide this formulation stability. Thus, in U.S. Pat. No. 3,827,996 issued Aug. 6, 1974 to Beresniewicz, the higher levels of hydrolysis were achieved by using 93 to 97% hydrolyzed alcohol or by blending fully hydrolyzed polyvinyl alcohol with sufficient amounts of other alcohols to produce the average of 5 to 7 mole percent vinyl acetate, provided the alcohols used in the blend did not have vinyl acetate levels above about 16 mole percent. Other formulations have been prepared using the same general approach but blending the polyvinyl alcohols so as to achieve a final level of only about 90 to 92% hydrolysis as was done in U.S. Pat. 4,521,561 issued Jun. 4, 1985 to Hausman et al. and by using blend of fully hydrolyzed polyvinyl alcohol with mixtures of different molecular weight partially hydrolyzed alcohols as in U.S. Pat. 5,143,966 issued Sep. 1, 1992 to Lee et al. Using these techniques which employ higher levels of hydrolysis in the polyvinyl alcohols used in the polymerization, the resulting emulsions do exhibit somewhat improved performance with respect to their compatibility with the fully hydrolyzed polyvinyl alcohol; however, in many cases, this improvement is coupled with a decrease in the performance or application properties such as mechanical stability, speed of set, as well as other machining properties such as ease of clean-up.

Regardless of the approach, it is seen that all the prior techniques for preparing improved emulsion polymers have stressed the necessity for using polyvinyl alcohol having relatively high levels of hydrolysis and have consistently avoided the use of alcohols having average vinyl acetate content greater than about 10 to 16 mole percent, believing that the use of such alcohols will jeopardize the compatibility with the fully hydrolyzed alcohol.

SUMMARY OF THE INVENTION

We have now found that ethylene-vinyl ester based emulsion polymers may be prepared in the presence of 2 to 8% by weight of a protective colloid consisting of a blend of 1 to 3 percent by weight of 80% hydrolyzed polyvinyl alcohol, 0 to 2% by weight of 88% hydrolyzed polyvinyl alcohol and 1 to 3 percent by weight of 96% hydrolyzed polyvinyl alcohol, the blend having an average level of hydrolysis of 85 to 88%.

Surprisingly, despite the presence of substantial amounts of the 80% hydrolyzed polyvinyl alcohol, the resultant emulsion polymer is compatible with the post-added fully hydrolyzed polyvinyl alcohol while possessing an overall balance of properties comparable to those achieved with conventional formulations prepared with the 88% hydrolyzed polyvinyl alcohol protective colloid. In addition, the presence of the 80% hydrolyzed alcohol as a portion of the protective colloid, improves the polymerization reaction by helping to control the particle size thereby providing more uniform emulsions.

DETAILED DESCRIPTION OF THE PREFERRED EMBODIMENTS

The protective colloid blend may be used in the production of any vinyl ester ethylene based emulsion binders.

While vinyl acetate is the most readily available vinyl ester used, other $C_1$–$C_{13}$ esters may also be used in amounts of 70 to 95% by weight of the copolymer. The ethylene component is generally present in levels of 5 to 30%, preferably 5 to 15% by weight.

Optionally, functional comonomers such as triallyl cyanurate, triallyl isocyanurate, diallyl maleate, diallyl fumarate, allyl glycidyl ether, divinyl benzene and diallyl phthalate may also be used at levels of 0.05 to 0.5% by weight.

It is also most desirable to incorporate in the emulsion copolymer 0.5 to 5% of a carboxyl or amide functionality. Examples of suitable ethylenically unsaturated mono- or di-carboxylic acid or half ester acids include the monocarboxylic ethylenically unsaturated acids such as acrylic, vinyl acetic, crotonic, methacrylic, tiglic, etc.; the dicarboxylic ethylenically unsaturated acids such as maleic, fumaric, itaconic, maleic, citraconic, hydromuconic, allylmolonic, etc., as well as the half esters of these dicarboxylic acids such as mono(2-ethylhexyl)maleate, monoethyl maleate, monobutyl maleate, etc.

Useful amides are the amides of a, β-olefinically unsaturated carboxylic acids such as acrylamide methacrylamide, and diacetone acrylamide; N-alkylol amides of a, β-olefinically unsaturated carboxylic acids such as N-methylol acrylamide and N-methylol methacrylamide; N-alkoxyalkyl amines of a, β-olefinically unsaturated carboxylic acids such as N-methoxymethyl acrylamide and N-butoxymethyl methacrylamide.

Alternatively, the colloidal blend may be used to prepare vinyl ester, ethylene, acrylate terpolymers in which case alkyl acrylates containing 2 to 8 carbon atoms in the alkyl group may be used in amounts of about 15 to 60% by weight, preferably 25 to 40%. Suitable acrylates include butyl, hexyl, 2-ethyl hexyl and octyl acrylates as well as the corresponding methacrylates and mixtures thereof.

The resulting emulsion is then polymerized using conventional batch or semi-batch, emulsion polymerization procedures in an aqueous medium using a free-radical catalyst and a surfactant, the pH of the aqueous system being maintained by a suitable buffering agent, if necessary, and at pressures of 10 to 130 atmospheres as taught, for example, in U.S. Pat. Nos. 3,708,388; 3,404,112 and 3,716,504. The ethylene content of the polymer depends on the ethylene content of the aqueous polymerization medium. Factors which control the ethylene content of the polymerization medium include the partial pressure of ethylene in the vapor phase over the medium and the temperature at which the polymerization is performed. Typically temperatures of 120° to 175° F., and ethylene partial pressures of 50 to 1,500, preferably from 240 to 1,000 psig, are sufficient to incorporate from 1 to 30, preferably from 5 to 15, weight percent ethylene in the polymer. Preferably the ethylene partial pressure is maintained constant throughout the polymerization period so that this monomer is continuously supplied at a constant rate.

The polymerization is typically initiated by a free radical initiator such as water soluble peracid or salt thereof, e.g., hydrogen peroxide, peracetic acid, persulfuric acid or the ammonium and alkali metal salts thereof, e.g., ammonium persulfate, sodium peracetate, lithium persulfate, potassium persulfate, sodium persulfate, etc. Alternatively, organic peroxides such as benzoyl peroxide, t-butyl hydroperoxide, etc., may also be employed. A suitable concentration of the initiator is from 0.05 to 5.0 weight percent and preferably from 0.1 to 3 weight percent.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g., sodium metabisulfite, sodium formaldehyde sulfoxylate, potassium metabisulfite, sodium pyrosulfite, or other reducing agent such as ascorbic acid, etc. The amount of reducing agent that can be employed throughout the copolymerization generally varies from about 0.1 to 3 weight percent of the amount of polymer. In the case of polymers containing functional comonomers, the comonomers are added gradually as is the initiator, either in an aqueous solution or, if not water soluble, dissolved in a small amount of vinyl acetate.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, methylene chloride and trichloroethylene, can also be added in some cases.

As discussed previously, the protective colloid system comprises a blend of 1 to 3 % by weight of 80% hydrolyzed polyvinyl alcohol, 0 to 2 percent by weight of 88% hydrolyzed polyvinyl alcohol and 1 to 3 percent by weight of 96% hydrolyzed polyvinyl alcohol, the blend having an average level of hydrolysis of 85 to 88%. It is preferred that the protective colloid consist of 2 to 3% by weight of the 80% hydrolyzed, 0.3 to 1% by weight of the 88% hydrolyzed and 2 to 3% by weight of the 96% hydrolyzed material. Most preferred results are obtained from a blend consisting of 2.5% of the 80% hydrolyzed, 0.5% of the 88% hydrolyzed and 2% of the 96% hydrolyzed polyvinyl alcohols. It will be understood that, for the purposes of the invention, the specific percentages used to represent the degree of hydrolysis of the polyvinyl alcohols are, in effect, average values and that commercial polyvinyl alcohols generally vary in hydrolysis levels within about 1 and sometimes up to 2 degrees of hydrolysis within each grade.

The molecular weights and consequent viscosity grades of the various polyvinyl alcohols used in the blend are not critical and can be used to control the final emulsion viscosity. However, it has been observed that the use of at least a portion of the low molecular weight (low viscosity grade) 80% hydrolyzed polyvinyl alcohol lowers the set speed and provides smaller particle size emulsions. By low molecular weight it is meant that the polyvinyl alcohol has a degree of polymerization ranging from 100 to 800, preferably 200 to 600, and most preferably 450 to 600. In contrast, medium molecular weight, medium viscosity polyvinyl alcohols have degrees of polymerization ranging from 1000 to 1800 while high molecular weight, high viscosity materials have degrees of polymerization of 1900 to 3000.

The total level of the protective colloid used will generally range from about 2 to 8% by weight, preferably 4 to 6% by weight, based on the weight of the major monomers.

The protective colloid systems used herein are generally the only dispersing agent employed or desired, however, small amounts (e.g., up to about 1%) of other protective colloids such as casein, hydroxyethyl starch, carboxymethyl cellulose, gum arabic, and the like, as known in the art of synthetic emulsion polymer technology may also be employed as may small amounts of nonionic emulsifiers. Examples or suitable non-ionic emulsifiers are the addition products of 5 to 50 mols of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof.

The protective colloid and optional emulsifiers can be added in its entirety to the initial charge to the polymerization zone or a portion of the emulsifier, e.g., from 25 to 90 percent thereof, can be added continuously or intermittently during polymerization.

The polymerization reaction is generally continued until the residual monomer content is below about 1%. The completed reaction product is then allowed to cool to about room temperature while sealed from the atmosphere. It is then de-gassed of ethylene and finished with additional redox to achieve the desired low residual vinyl ester levels.

The emulsions are produced at relatively high solids contents, e.g., between 35 to 70%, and may be diluted with water if desired for use.

EXAMPLE

A general procedure for the preparation of a vinyl acetate ethylene copolymer emulsion of the invention is as follows:

The initial charge to the reactor includes the following:

| | |
|---|---|
| Water (deionized) | 805.0 g |
| Airvol 425 (10% Aq. Solution) | 1,025.0 |
| Goshenol KL-05 (10% Aq. Solution) | 900.0 |
| Airvol 523 (10% Aq. Solution) | 125.0 |
| Ferrous Sulfate (1% Aq. Solution) | 6.1 |
| Phosphoric acid | 1.5 |
| Vinyl acetate | 3,500.0 g |
| Ethylene - amount to equilibrate reactor to 275 psi at 50° C. | |

-continued

Slow Addition

| | |
|---|---|
| 1. Hydrogen Peroxide (30% Aq. Solution) | 10.0 g |
| Water (deionized) | 200.0 g |
| 2. Water (deionized) | 215.0 g |
| Sodium formaldehyde sulfoxylate | 7.7 g |
| Sodium acetate | 0.7 g |

The pH of the water containing the various grades of polyvinyl alcohol and iron was adjusted to 3.7 to 4.0 with the phosphoric acid (initial aqueous mix).

A 10 L stainless steel reactor was filled with the initial aqueous mix. It was flushed with nitrogen. With the agitation at 250 rpm, the vinyl acetate was added. After closing the reactor port, it was purged twice with nitrogen (25 to 40 psi) and twice with ethylene (50 psi). It was then heated to 50° C. Agitation was increased to 550 rpm and it was pressurized to 300 psig with ethylene. The reactor temperature and ethylene pressure were allowed to equilibrate for 20 minutes. The ethylene value was then closed to turn off ethylene supply. Agitation was reduced to 500 rpm.

Before initiating the reaction, 20% of the reducing agent, slow-addition No. 2 was added. After five minutes the reaction was initiated by starting both slow-additions, No. 1 and 2, at a 2.5 hour rate (80 cc/hr). After the temperature rises 2° C., the jacket temperature and oxidizer rate (No. 1) are adjusted to allow the temperature to reach 80 to 82° C. in about 30 minutes. The oxidizer rate is then adjusted to maintain a 30° average temperature delta (reaction temperature minus jacket temperature).

The reaction is run until the residual VAM is reduced to 2% (about 2 to 2.5 hours). It is then cooled to 45° C. and transferred to the degassing tank to vent off residual ethylene pressure. Defoamer, Colloid 685 from Allied Colloids was added to the degassing tank, followed by the addition of 15 g of a 5% hydrogen peroxide solution. After five minutes 15 g of a 6% sodium formaldehyde sulfoxylate solution was added over 15 minutes and mixed 15 minutes. After cooling to 30° C., the final ph of the emulsion is adjusted to 4 to 5 with 14% ammonium hydroxide.

The emulsion had the following properties.

| | |
|---|---|
| Solids, % | 57.1 |
| pH | 4.0 |
| Viscosity (20 rpm, RVT #3) | 2170 cps |
| % Grit (200 mesh) | 0.004 |
| Tg | +20° |
| P.S.W. | 0.87 µ |

All of the other examples were made by a similar procedure using the listed polyvinyl alcohol blend in the initial charge.

A Tg range of +17 to +23° C. was used for comparison in these examples. By varying ethylene pressure, ethylene vinyl acetate copolymers in the range of -15 to +25° C. can be produced with the polyvinyl alcohol blends.

TEST PROCEDURES

Adhesive Open Time: Open time is the maximum time lapse between applying the adhesive and bringing the substrates together, within which a satisfactory bond is obtained.

A 1.5 mil. film of latex to be tested (at 77° F.) is drawn across taped down kraft paper. Every ten seconds a 1" kraft strip is placed vertically on the film and the strip is wiped across with finger (moderate pressure). After placement of the fourth strip (40 seconds), the original is lifted. The strip that is pulled and has <50% fibre tear designates the open time of the adhesive.

Plasticizer Response: To determine viscosity response of an adhesive with addition of plasticizer.

Benzoflex B-50 plasticizer is added to the adhesive at 10 parts plasticizer per 100 parts latex. The mixture is combined in a Bodine Mixer for 30 min. using a four blade stirrer at Rheostat setting of 50. An unplasticized sample should be similarly mixed for 30 min. to judge sheared viscosity and establish a base line. After mixing, the samples are brought to 77° F. by placing in a bath and the viscosity measured at 20 rpm. The samples are placed back in the bath to test for overnight stability. The response factor is the plasticized viscosity divided by the unplasticized sheared viscosity at 20 rpm.

Set Speed: To determine the time required to produce a fibre tear bond of an adhesive after the application to the substrate over time.

A length of kraft paper (~15"long) is secured onto drawndown board. Pre-cut strips of kraft paper (1 ¼"×4") are laid on top so that strips lay in center of bottom sheet. All the strips are folded back and a 1.5 mil wet firm of adhesive is drawndown onto the kraft paper using a bird applicator. Immediately the strips are folded down onto the wet film and rolled once with the 5 lb. roller. The strips are pulled up and off the adhesive at two second intervals and the time to fibre pick and fibre tear is recorded. 50 to 100% fibre pick/tear is considered the set time (in seconds) of the adhesive.

Tack: The tack test is a quick, qualitative test created to measure wet tack and dry tack of an adhesive. Tack is classified into two types:

1) Wet tack: also called grad or initial tack, is the tack of an adhesive before the liquid carrier (organic solvent or water) was fully evaporated.

2) Dry tack: also called residual tack, "quick stick", or pressure sensitivity, is the tack remaining after the liquid carrier has evaporated.

Using disposable eye droppers, 5 drops of both a control and a test sample are placed about 2" apart on plain paper. With the index and middle finger the samples are dispersed in a circular oval motion being careful not to allow latex to blend into each other. After about 10 rubs, one finger at a time is raised to compare the wet tack and dry tack of one latex with each other. This step is continued by pressing one finger at a time until the latex is almost dry. Each sample is rate qualitatively by comparing which one is the "stickiest" or the one with the strongest cohesive force.

Wet Rubs: To measure water sensitivity of a dried adhesive film.

The adhesive is hand stirred using a tongue blade to a uniform consistency. Then a drawdown 1.5 mil film is made onto a clean glass plate and allowed to air dry overnight. Three drops of water are applied to the film and rub with finger until film breaks. The procedure is repeated several times on the same film and the number of finger rubs required to break point is noted and compared to the control. The procedure is repeated using adhesive samples to which 10 parts plasticizer has been added. The results of the two different tests are noted with a slash between the "neat" wet rub and the "plasticized" value.

Polyvinyl Alcohol Compatibility

An equal weight of a 10% aqueous solution of a fully- or partially-hydrolyzed polyvinyl alcohol containing 0.2 parts per hundred Nopco JMY defoamer is added to about 175 to 200 g of emulsion. An additional 0.6 to 0.8 g of defoamer is then added to the mixture which is mixed at medium speed in a T-line laboratory mixer for about 20 to 25 minutes. The viscosity at 25° C. 20 rpm, #4 spindle RVF viscometer is checked after 16 to 20 hours and adjusted with water if necessary to a viscosity of 1,000 ±50 cp. The mixture is poured into two 100 ml graduated cylinders up to the 100 ml level with one cylinder then placed in an oven at 50° C. or 120° F. and the other cylinder kept at ambient conditions. The percent separation is recorded after every 24 hours for a period of two weeks for the mixture at elevated temperature and for 30 days for the mixture at ambient conditions.

Following this general procedure, a series of emulsion polymers were prepared and tested. The compositions and test results are show in Table 1.

relatively higher (24 to 26), the plasticized wet rub values are high while the plasticizer response decreases.

In summary, the results show that there is good compatibility with fully hydrolyzed polyvinyl alcohol and an improved balance of properties including fast set speed, excellent mechanical stability (machinery) and ease of clean-up using the protective colloid blend of the present invention.

We claim:

1. A process for the preparation of emulsion polymers comprising 70 to 95% by weight of a vinyl ester and 5 to 30% by weight ethylene, the polymerization being carried out in the presence of 2 to 8% by weight of a protective

TABLE I

| EXAMPLES | KL-05 1–3 | A-523 0–2 | A-425 1–3 | AVG HYD 85–88% | PVOH 3.5–6 PTS | 55% VISC cps | WET TACK | OPEN TIME | WET RUBS | SET SPEED | COM | PR |
|---|---|---|---|---|---|---|---|---|---|---|---|---|
| 1 | 3.2 | 0.3 | 1.5 | 85 | 5 | 1370 | = | = | 20/45 | 25 | 6 | 2.8 |
| 2 | 2.0 | 0.8 | 1.2 | 86 | 4 | 1450 | = | = | 40/100 | 23 | 6 | 3.2 |
| 3 | 2.5 | 1.0 | 1.5 | 86 | 5 | 2550 | = | = | 5/10 | 21 | 24 | 2.6 |
| 4 | 3.0 | 1.2 | 1.8 | 86 | 6 | 3270 | = | = | 5/15 | 23 | 13 | 5 |
| 5 | 1.0 | 1.0 | 1.0 | 87.5 | 4 | 3760 | s> | = | 30/100 | 24 | 8 | 3.2 |
| 6 | 1.5 | 1.0 | 1.5 | 87.6 | 4 | 1870 | = | = | 40/100 | 22 | 8 | 3.1 |
| 7 | 2.0 | 1.0 | 2.0 | 87.6 | 5 | 3280 | = | = | 20/45 | 23 | 0 | 3.1 |
| 8 | 2.5 | 0.3 | 2.5 | 87.6 | 6 | 4230 | s> | = | 5/5 | 20 | 4 | 2.5 |
| 9 | 2.2 | 0.3 | 2.5 | 88 | 5 | 1470 | = | = | 20/90 | 23 | 0 | 3.3 |
| 10 | 2.2 | 0.9 | 2.5 | 88 | 5 | 1140 | = | = | 10/30 | 21 | 9 | 2.3 |
| 11 | 1.6 | — | 2.5 | 89 | 5 | 2590 | = | = | 5/5 | 24 | 0 | 2.0 |
| 12 | 3.5 | — | 1.5 | 84.5 | 5 | 1200 | = | = | 10/10 | 23 | 1 | 2.2 |
| 13 | 3.0 | — | 2.0 | 86 | 5 | 1690 | = | = | 10/10 | 23 | 4 | 2.4 |
| 14 | 1.75h | — | 1.75 | 87.5 | 3.5 | 1580 | s> | = | 20/75 | 31 | 0 | 2.7 |
| 15 | 2.0 | — | 2.0 | 87.5 | 4 | 800 | = | = | 50/100 | 23 | 0 | 3.5 |
| 16 | 1/1h | — | 2.0 | 87.5 | 4 | 2480 | > | = | 10/40 | 28 | 27 | 3.1 |
| 17 | 2.0h | — | 2.0 | 87.5 | 4 | 2460 | = | > | 35/85 | 26 | 2 | 3.9 |
| 18 | 2.5 | — | 2.5 | 87.5 | 5 | 1810 | = | = | 15/40 | 22 | 15 | 3.3 |
| 19 | 3.0 | — | 3.0 | 87.5 | 6 | 1880 | = | = | 5/10 | 19 | 3 | 1.9 |
| 20 | 1.5 | — | 3.5 | 90.5 | 5 | 1470 | s> | = | 20/100 | 24 | 12 | 2.0 |
| 21 | 1.0 | — | 4.0 | 92 | 5 | 1400 | > | = | 10/100 | 26 |  | 2.3 |
|  |  |  |  |  |  |  |  |  |  |  |  | 1.9 |
| A | — | 1.5/1.4 | 1.1 | 90 | 4 | 3530 | = | > | 30/100 | 24 | 10 | 3.3 |
| B | — | 2.5 | 1.0 | 90 | 3.5 | 5060 |  |  |  |  |  |  |
| C | — | 1/1 | 2.0 | 93 | 4 | 1540 | s> | = | 15/65 | 25 | 0 | 2.6 |
| D | — | 2.5 | 2.5 | 93 | 5 | 4500 | = | > | 40/100 | 26 | 0 | 4.0 |
| E | — | 1.2 | 2.8 | 93 | 4 | 2590 | = | > | 10/100 | 26 | 0 | 3.0 |
| F | — | 1.5 | 1.5–1.0 | 93 | 4 | 3930 | + | < | 10/100 | 28 | 0 | 3.0 |
| G | — | 0.6 | 2.0–1.4 | 95 | 4 | 1960 | = | < | 10/100 | 30 |  | 2.4 |
| H | — | 0.75 | 1.75–2.5 | 95.5 | 5 | 2290 | > | = | 30/65 | 28 | 0 | 2.5 |

Key
PVOH: Goshenol KL-05 Low Viscosity (78.5–81.5% hydrolyzed polyvinyl alcohol from Nippon Gosei, a 4% solution of which has a viscosity of 4–5 cps.)
Airvol 523 Medium Viscosity (87–89% hydrolyzed polyvinyl alcohol from Air Products, a 4% solution of which has a viscosity of 22–26 cps)
Airvol 425 Medium Viscosity (95.5–96.5% hydrolyzed polyvinyl alcohol from Air Products, a 4% solution of which has a viscosity of 27–31 cps)
Com: Compatibility with fully hydrolyzed PVOH: % setting after 21 dyas @ 120° F.
PR: Plasticizer response In the polyvinyl alcohol blends tested, the following was observed:

1. Even at low average hydrolyzed polyvinyl alcohol levels (85 to 88), fast set speed (20 to 23 seconds) can be attained with acceptable compatibility with fully hydrolyzed polyvinyl alcohol and high wet tack, good open time (tack range), good mechanical stability, high plasticizer response, and good clean-up.

2. At higher average hydrolyzed (93%), the comparative examples showed slower set speed (26 to 30 seconds), and higher water resistance with consequent poorer clean-up.

3. There is also observed in the comparative blends,(e.g., Examples 20 and 21) with 90–92% average hydrolysis and with higher levels of the 96% hydrolyzed polyvinyl alcohol (3.5 to 4 pts) and lower levels of the 80% hydrolyzed polyvinyl alcohol (1 to 1.5 pts) that the set speeds are colloid consisting of a blend of 1 to 3 percent by weight of 80% hydrolyzed polyvinyl alcohol, 0 to 2 percent by weight of 88% hydrolyzed polyvinyl alcohol and 1 to 3 percent by weight of 96% hydrolyzed polyvinyl alcohol, the blend having an average level of hydrolysis of 85 to 88%.

2. The process of claim 1 wherein the vinyl ester is vinyl acetate.

3. The process of claim 1 wherein the ethylene is present in an amount of 5 to 15% by weight of the emulsion polymer.

4. A process for the preparation of emulsion polymers comprising a vinyl ester, 5 to 30% by weight ethylene and 0.05 to 0.5% by weight of a functional comonomer selected from the group consisting of triallyl cyanurate, triallyl isocyanurate, diallyl maleate, diallyl fumarate, allyl glycidyl ether, divinyl benzene and diallyl phthalate, the polymerization being carried out in the presence of 2 to 8% by weight of a protective colloid consisting of a blend of 1 to 3 percent by weight of 80% hydrolyzed polyvinyl alcohol, 0 to 2 percent by weight of 88% hydrolyzed polyvinyl alcohol and 1 to 3 percent by weight of 96% hydrolyzed polyvinyl alcohol, the blend having an average level of hydrolysis of 85 to 88%.

5. A process for the preparation of emulsion polymers comprising a vinyl ester, 5 to 30% by weight ethylene and 0.5 to 5% by weight of a monomer containing carboxyl or amide functionality, the polymerization being carried out in the presence of 2 to 8% by weight of a protective colloid consisting of a blend of 1 to 3 percent by weight of 80% hydrolyzed polyvinyl alcohol, 0 to 2 percent by weight of 88% hydrolyzed polyvinyl alcohol and 1 to 3 percent by weight of 96% hydrolyzed polyvinyl alcohol, the blend having an average level of hydrolysis of 85 to 88%.

6. A process for the preparation of emulsion polymers comprising a vinyl ester, 5 to 30% by weight ethylene and 15 to 60% by weight of an alkyl acrylate containing 2 to 8 carbon atoms in the alkyl group, the polymerization being carried out in the presence of 2 to 8% by weight of a protective colloid consisting of a blend of 1 to 3 percent by weight of 80% hydrolyzed polyvinyl alcohol, 0 to 2 percent by weight of 88% hydrolyzed polyvinyl alcohol and 1 to 3 percent by weight of 96% hydrolyzed polyvinyl alcohol, the blend having an average level of hydrolysis of 85 to 88%.

7. The process of claim 6 wherein the alkyl acrylate is present in an amount of 25 to 40% by weight of the emulsion polymer.

8. The process of claim 1 wherein the protective colloid consists of a blend of 2 to 3% by weight of the 80% hydrolyzed polyvinyl alcohol, 0.3 to 1% by weight of the 88% hydrolyzed polyvinyl alcohol and 2 to 3% by weight of the 96% hydrolyzed polyvinyl alcohol.

9. The process of claim 1 wherein the protective colloid consists of 2.5% of the 80% hydrolyzed polyvinyl alcohol, 0.5% of the 88% hydrolyzed polyvinyl alcohol and 2% of the 96% hydrolyzed polyvinyl alcohol.

10. The process of claim 1 wherein at least a portion of the 80% hydrolyzed polyvinyl alcohol comprises a low viscosity, low molecular weight grade having a degree of polymerization ranging from 100 to 800.

11. The process of claim 1 wherein the protective colloid is used in an amount of 4 to 6% by weight based on the weight of the major monomers.

12. The process of claim 1 wherein the polyvinyl alcohol protective colloid mixture is the only dispersing agent employed.

13. The vinyl ester/ethylene emulsion prepared by the process of claim 1.

14. The vinyl ester/alkyl acrylate/ethylene emulsion prepared by the process of claim 6.

* * * * *